United States Patent
Sacks et al.

(10) Patent No.: US 7,464,037 B2
(45) Date of Patent: Dec. 9, 2008

(54) METHOD FOR OBJECT DELIVERY

(76) Inventors: Jerry Dennis Sacks, 3655 Westcenter Dr., Houston, TX (US) 77042; James Michael Parks, 3655 Westcenter Dr., Houston, TX (US) 77042; Jeffrey Christopher Lepp, 3655 Worfield Courty, Houston, TX (US) 77042

( * ) Notice: Subject to any disclaimer, the term of this patent is extended or adjusted under 35 U.S.C. 154(b) by 586 days.

(21) Appl. No.: 10/737,952

(22) Filed: Dec. 15, 2003

(65) Prior Publication Data

US 2004/0133303 A1  Jul. 8, 2004

Related U.S. Application Data

(60) Provisional application No. 60/436,067, filed on Dec. 23, 2002.

(51) Int. Cl.
*G06Q 99/00* (2006.01)
(52) U.S. Cl. .......................... 705/1; 235/375
(58) Field of Classification Search ............. 705/1; 235/375
See application file for complete search history.

(56) References Cited

U.S. PATENT DOCUMENTS

| | | | |
|---|---|---|---|
| 5,274,560 A * | 12/1993 | LaRue | 701/202 |
| 6,070,793 A * | 6/2000 | Reichl et al. | 235/375 |
| 2002/0107873 A1* | 8/2002 | Winkler et al. | 707/104.1 |
| 2003/0020629 A1 | 1/2003 | Swartz | 340/825.25 |
| 2003/0101069 A1* | 5/2003 | Sando | 705/1 |
| 2004/0054607 A1* | 3/2004 | Waddington et al. | 705/28 |
| 2004/0117196 A1* | 6/2004 | Brockman et al. | 705/1 |
| 2004/0118907 A1* | 6/2004 | Rosenbaum et al. | 235/375 |

FOREIGN PATENT DOCUMENTS

GB  2 159 495 A  * 12/1985

OTHER PUBLICATIONS

Anonymous, "Wireless POD for Palm," Fleet Owner, Sep. 2002, p. 70.*

* cited by examiner

*Primary Examiner*—John W. Hayes
*Assistant Examiner*—Nathan H. Erb
(74) *Attorney, Agent, or Firm*—Buskop Law Group, PC; Wendy Buskop

(57) ABSTRACT

The invention is a method for objects delivery at a location comprising the steps of using a mobile computer having a bar code reader, a display, an audio output device, a tactile input device, text to speech software, a voice recognition software, delivery system software, and radio frequency identification (RFID) reader, wherein said mobile computer is adapted for communication between a delivery server system and a user and the delivery server system is adapted for communication between the mobile computer and at least one external computer system.

11 Claims, 17 Drawing Sheets

Delivery Receipt
2/19/01 1:29 PM

0133 XYZ FOOD MARKETS
1234 Any Street
Houston, TX 99999

Driver: Andrew Johnson

| Objects Delivered | Qty |
|---|---|
| Apple, Granny Smith 36 ct | 2 |
| Lettuce, Shredded 5 lbs | 1 |
| American Cheese White 6/5lbs. | 4 |
| Wawa Turkey Breast | 3 |
| Total | 10 |

| Out of Stock (not on invoice) | Qty |
|---|---|
| American Cheese White 6/5lbs | 2 |
| Total | 2 |

Credit ref: 041-4296-529-11

| Rejected: | Qty |
|---|---|
| Apple, Granny Smith 36ct | 1 |
| Total | 1 |

Store: 0133
Order: 547790

Received by: John Doe

*John Doe*

Figure 17

METHOD FOR OBJECT DELIVERY

CROSS-REFERENCE TO RELATED APPLICATIONS

This application claims priority to co-pending U.S. patent application Ser. No. 60/436,067, filed on Dec. 23, 2002, which is incorporated by reference herein.

FIELD OF THE INVENTION

The present invention relates to a method for delivering at least one object to at least one location, using a transport vehicle, such as a truck.

BACKGROUND OF THE INVENTION

Current methods for locating and developing an object at a location (customer) are slow, and subject to error. The users, herein also called drivers, who are responsible for gathering items and delivering them, tend to make mistakes in reading the delivery list, selecting the correct object, the correct quantity of objects or generally being too slow.

In traditional delivery systems, the process has relied on printed delivery lists and labels on the objects that specify the location (customer) where the object is to be delivered. However, under the pressures of changing requirements, large quantities of objects and the data need to meet the various requirements. A different process is required to allow the driver to find the objects quicker and improve delivery accuracy.

Before introducing in detail the capabilities of the system of the invention, the problems of the present process with its limitations include:

a. the system needs to register objects manually, which often results in mistakes
b. the current process does not tell the driver where the object is located;

A need has existed to overcome the above problems the present invention has been designed to overcome these problems.

SUMMARY OF THE INVENTION

The invention overcomes the needs in the prior art by providing a method for delivering an object from a transport vehicle also called a truck or trailer herein, using a mobile computer. The mobile computer has a bar code reader, a display, an audio input device, an audio output device, a tactile input device, text-to-speech software, a voice recognition software, loader applications software, a printer and radio frequency identification (RFID) reader. The mobile computer receives the required delivery information consisting of the delivery locations, herein also called stops or customers and the specific objects that are to be delivered at each location (before the user leaves the warehouse) from the delivery server system. The delivery server system communicates with at least one external computer system. This information is then presented to the driver as required during the route startup and delivery process.

When a user, also referred to herein as the driver, has logged on and adapted the software, the software provides instructions to the user using the text-to-speech software to the audio output device. The instructions include a list of locations and the specific objects to be delivered at each location. This information is also displayed for the user using the mobile computer display. The user acknowledges receipt of the list and locates the objects. The software validates whether the user found the correct object. The user delivers the verified object. The method continues until the user has gone to all of the route locations and all of the objects are delivered.

At the end of the route, completion of the objects deliveries, an acknowledgement is provided to the delivery server system. The acknowledgment includes a report of the results of all of the method steps. The results are then transferred from the delivery server system to at least one external computer system.

BRIEF DESCRIPTION OF THE DRAWINGS

The present invention will be explained in greater detail with reference to the appended figures, in which:

FIG. 17 is a delivery receipt.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention will become more fully understood from the detailed description given herein below. However, the following description is for purposes of illustration only, and thus is not limitative of the invention.

The invention relates to a method for selecting specified objects from a transport vehicle and delivering them to locations using a variety of techniques, including voice recognition software and text to speech software loaded on a handheld or mobile computer, an audio output such as a speaker on a headset, barcode scanner, a display, a tactile input device, and audio input, such as a microphone on a headset, and communication software which enables the handheld computer to communicate with a host server and a warehouse based management computer. Also the preferred method contemplates using a handheld computer, such as a palm computer with a radio frequency identification reader.

The invention provides a mobile system for use by the user in and around the transport vehicle with optimal process flow. The invention transforms the workflows of the object location, selection and delivery processes to improve objectivity and reduce the time required for such processes.

A preferred embodiment of the invention is disclosed to illustrate the practicality of the invention. It should be noted that most objects use a tagging system of some kind, visual, bar codes or radio frequency identification (hereafter "RFID") tags. However not all manufacturers can supply a standard. Warehouse personnel must be able to use a variety of objects identification devices to select the objects, from the transport vehicle for delivery.

Figure 1:
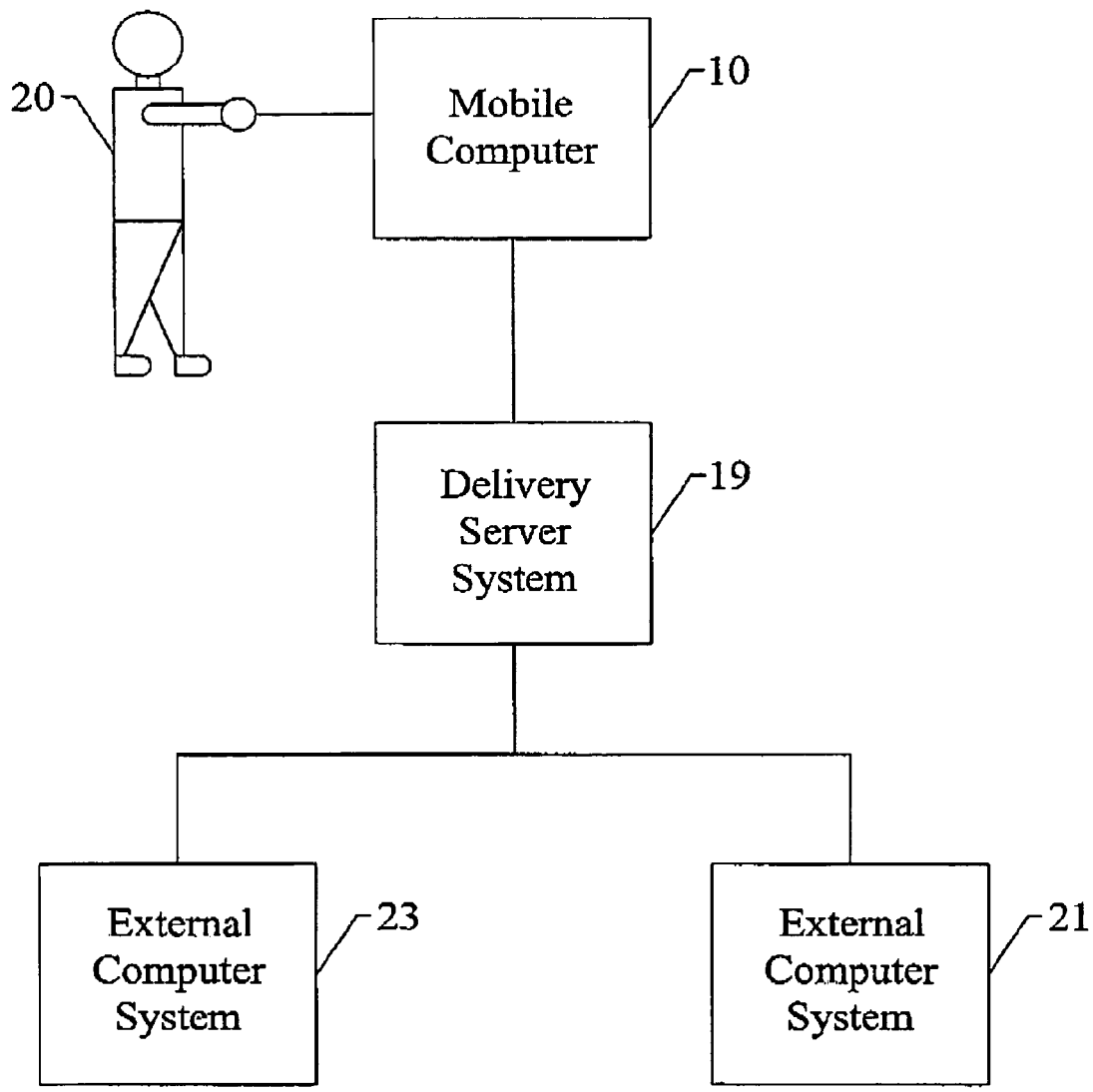
FIG. 1 is a diagram of an overview of the system for use by the method of the invention.

FIG. 1 shows the mobile computer (10) communicates between a delivery server system (19) and a user (20), such as a "picker" or "objects locator" person who traditionally is a warehouse employee. The Delivery Server System is adapted for communication between the mobile computer (10) and at least one external computer system. Two external computer systems are shown in FIG. 1, as external computer system (21) and (23).

Figure 2:
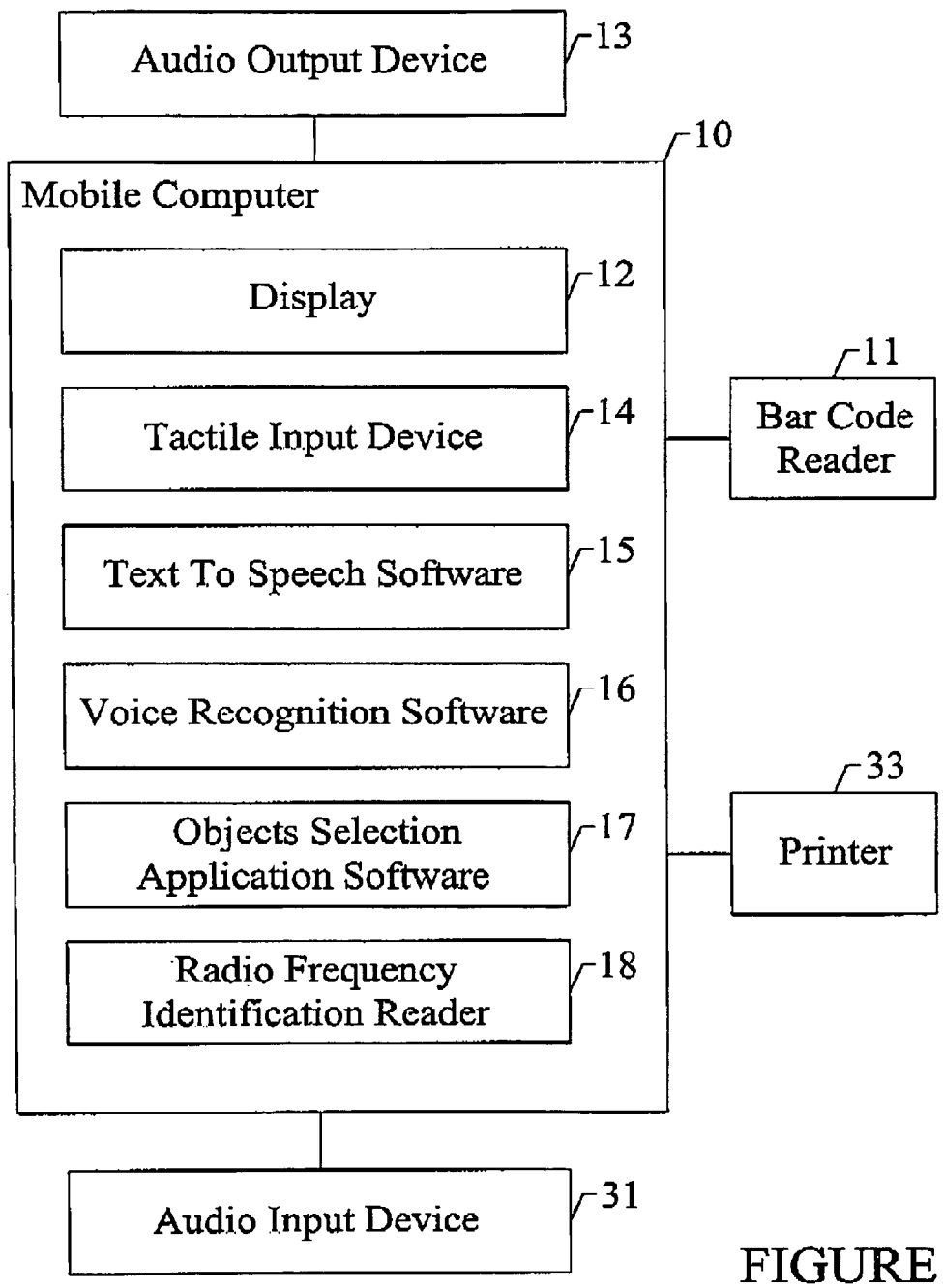
FIG. 2 is a diagram of the mobile computer and accessories used in the inventive method and the software stored thereon.

The method for objects selection at a location uses equipment and software shown in more detail in FIG. 2. In particular the method can most preferably use a mobile computer (10) having a bar code reader (11), a display (12), audio input device (31), an audio output device (13), a tactile input device (14), text to speech software (15), a voice recognition software (16), objects selection application software (17), a printer (33) and a radio frequency identification (RFID) reader (18). A typical mobile computer usable within the scope of this invention would be a handheld computer, such as PDT8146D4BA30WW or PDT8146-T4AB30WW available from Symbol Technologies. A typical audio output device and audio input device could be a headset, such as the Knowles Acoustics headset, single ear. The mobile computer is preferably wearable, such as with a holder part no. 11-53814-01 also available from Symbol Technologies. The voice recognition software can be Speech2Go Software or Vocom 3200 both available from ScanSoft, Inc. or Mobile Conversay MCSDK from Controversial Computer Corporation. The text to speech software can be ScanSoft objects, such as RealSpeak Solo Software. A typical wireless communication radio for the mobile computer is a Bluetooth Connection Kit consisting of the CompactFlash I/O Bluetooth Card, Type I provided by Socket Communications. The communication network which would enable the mobile computer to communicate with the host server in a wireless mode would be the Spectrum24 Wireless Network available from Symbol Technologies. A typical printer usable in this invention would be a QL320 or QL420 Wireless Bluetooth Printer from Zebra Technologies, Inc.

To initiate the method, the user (20), or warehouse person first enters a user code (22) to log onto the mobile computer. The user code can be entered through retinal scanning, through use of biometrics such as reading of a fingerprint, or by the more traditional method of simply inputting a code on the keyboard, or tactile input device of the mobile computer.

Next the log in code of the user is compared to prior log in codes used on the mobile computer, such as a Palm™ computer to see if the user has used this mobile computer before. If the user has not used this mobile computer, then the mobile computer prompts the user to use the voice recognition software resident on the mobile computer to train the use for accurate use by the user (23).

Next, instructions (30) are provided to the user from the delivery system software using the text to speech software to the audio output device. In most cases, the mobile computer essentially speaks to the user via a headset giving instructions on what to do next. In a preferred embodiment, objects information is provided from the delivery system software to the display of the mobile computer as well.

A request (32) is then transmitted from the mobile computer to the delivery server system (18) to identify objects on the load (34) and each destination location per object on the load. Using the applications software, a summary (36) of the number of objects to be delivered to each destination location is downloaded with other relevant information into the mobile computer generated from the list of objects to be pulled. The summary is then presented on the display of the MC. In addition to providing the summary on the display, the summary is provided using via the text to speech software which then provides output via the audio output device (38).

The user can then acknowledge the summary using the tactile input device (40), that is by typing "OK" on the keyboard of the mobile computer, or by acknowledging the summary using the audio input device (42, such as by saying "yes" in the microphone of a headset connected to the mobile computer.

The applications software generates a destination location list (44). Once at the destination, the user can acknowledge that he or she is at the destination (48) using the voice recognition software, or by scanning a bar code (50) or reading the RFID data (52).

The mobile computer then advises the user using the text to speech software to transport the object to a next destination location on the destination location list (54).

The text to speech software can be used to indicate the destination location is correct and that the objects are to be delivered to the destination location (56).

Using the text to speech software, the MC can indicate which objects and the quantity of objects to be delivered at the destination location (58) via the audio output device to the user. The user can speak characters that identify an object (60) or scan a bar code (62) or read RFID data of an object (64). The above steps can be repeated until all objects have been delivered by that user.

When the objects have been selected, the user can provide an acknowledgement to the delivery server system the results of the entire process steps (76); and the results can then be transferred from the delivery server system to at least one external computer system.

In another embodiment of the invention, the preferred acknowledgement word is "ready".

The method described above can be used to obtain status information concerning the user's performance, and compare specific individual performance to those of others in that warehouse, in similar warehouses of the same company, or to some other standard. These comparisons can be carried out by comparing the user's time to the expected completion time for steps (b) through (r), for example.

Figure 3A:
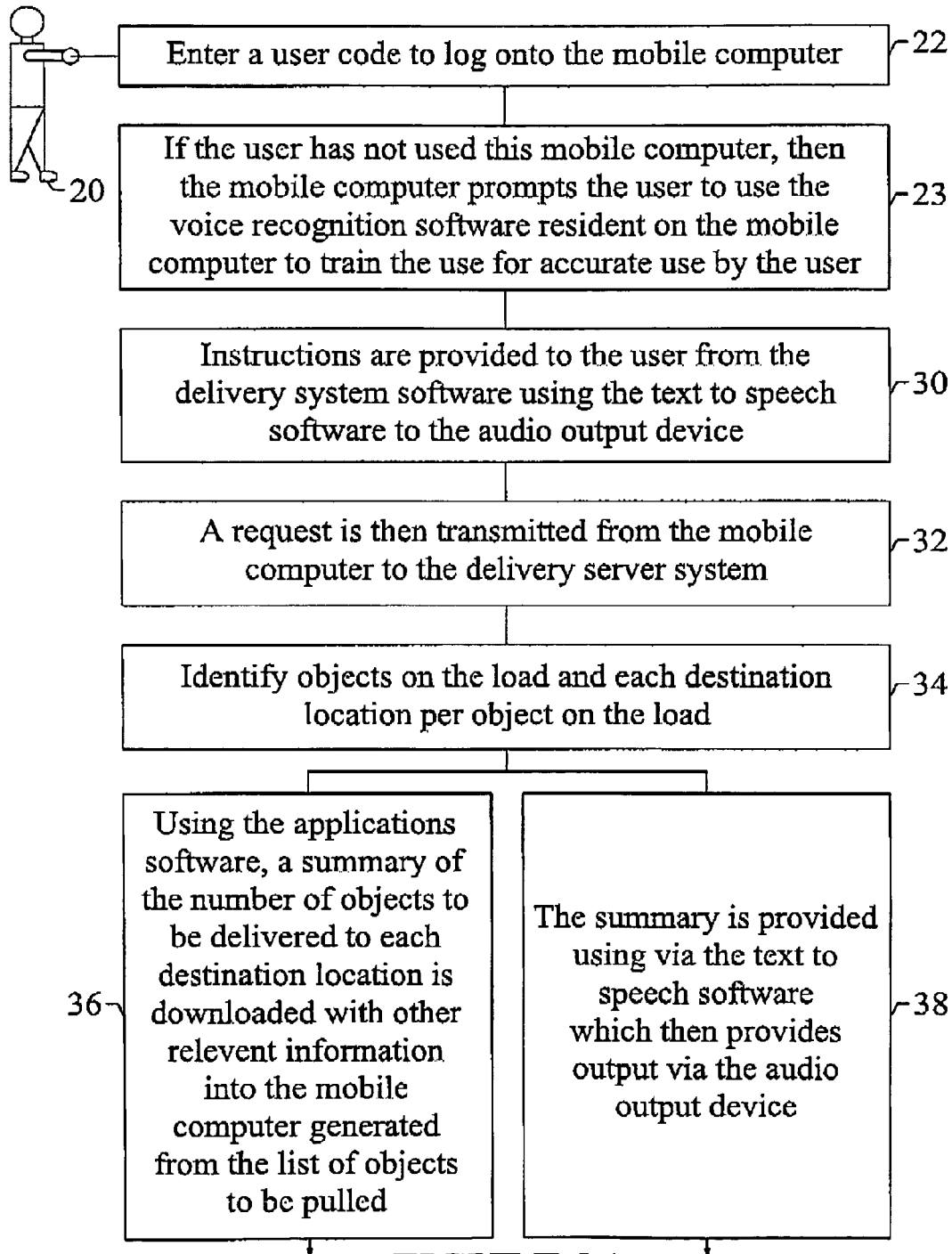
FIG. 3 is a diagram of the steps involved in the method of the invention.
Figure 3B:
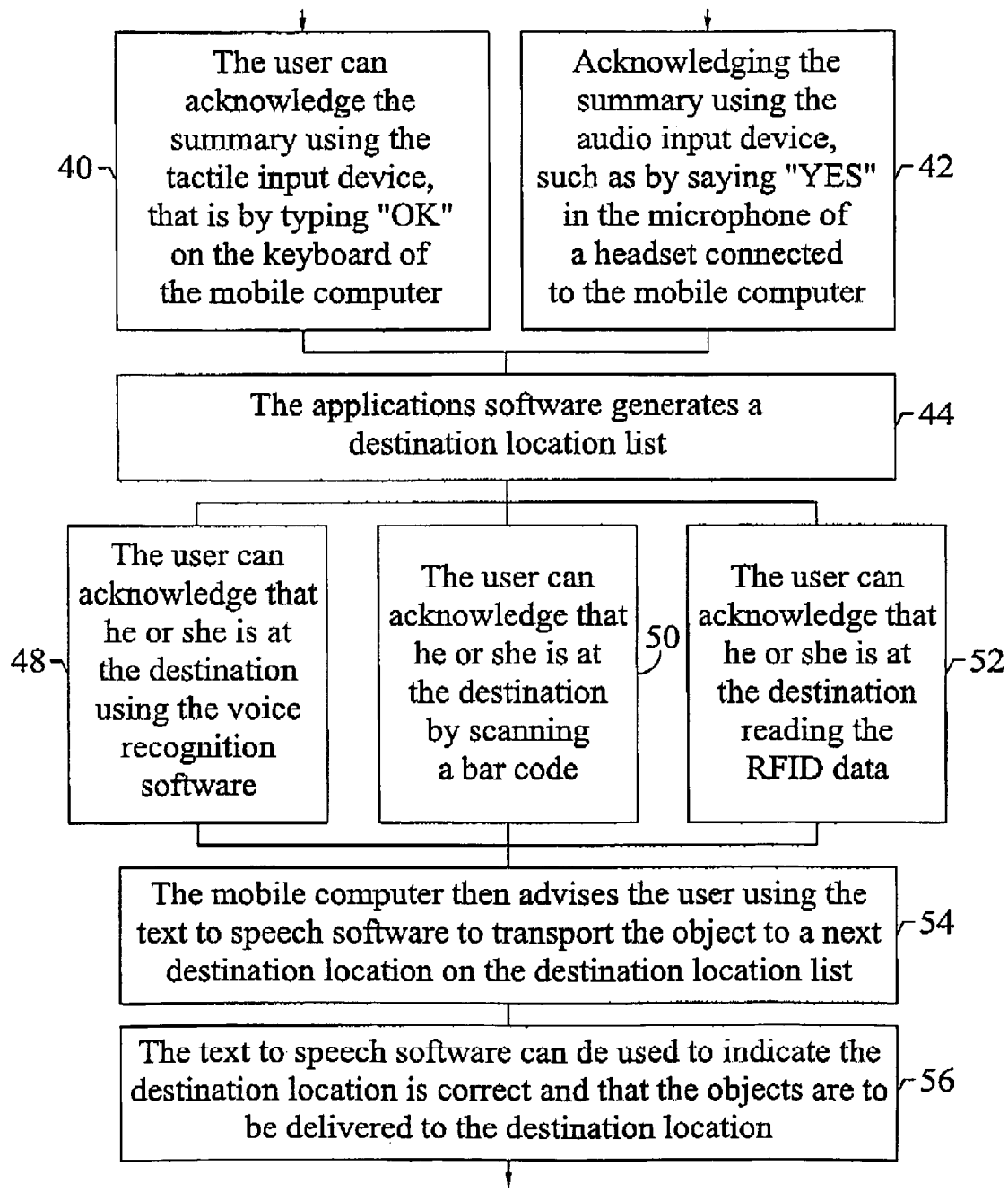
Figure 3C:
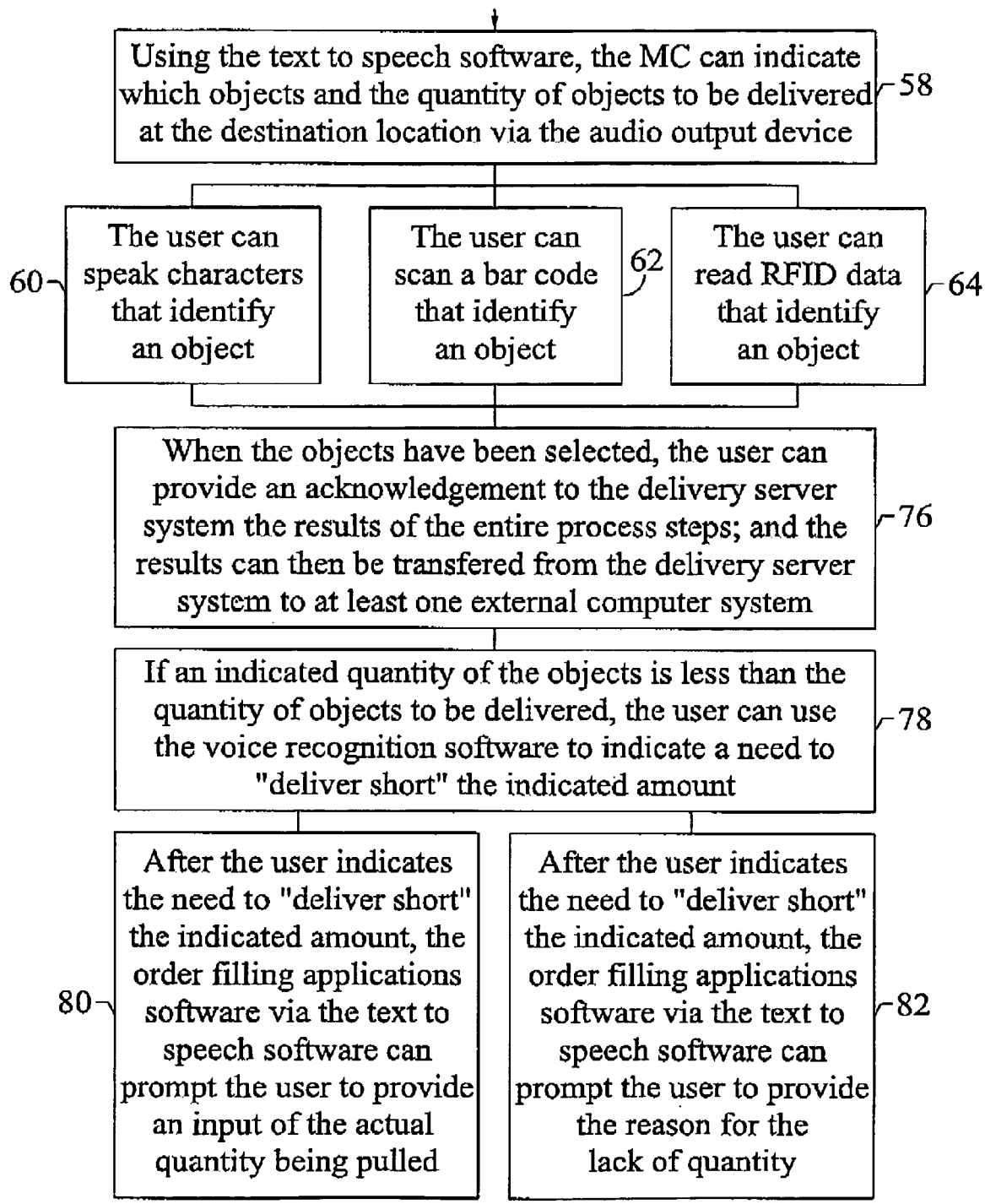

The method has as an embodiment shown in FIG. 3, that if an indicated quantity of the objects is less than the quantity of objects to be delivered, the user can uses the voice recognition software to indicate a need to "deliver short" the indicated amount (78). After the user indicates the need to "deliver short" the indicated amount, the order filling applications software via the text to speech software can prompt the user to provide an input on the following:

a. the actual quantity of objects pulled (80); and
b. the reason for the lack of quantity (82).

The method is contemplated to have a safety step. The method has the mobile computer asking the user for answers to a series of safety questions regarding a transport vehicle that moves the transport device such as:

a. are the brakes working of the transport vehicle?;
b. is the horn working?;
c. is the steering working?;

d. is there any damage to the transport vehicle, such as damaged wheels?,
e. are there any leaks to the system of the transport vehicle, such as are there oil leaks?;
f. are the tires inflated?; and
g. are the forks undamaged?.

The invention contemplates as a step that at any time during the method, a second user can contact the user from a remote location via the delivery server system, which communicates with the mobile computer which then provides the communication via audio output device and display.

The following paragraphs describe an example of the use of this novel system.

The delivery server system is a computer system designed to assist a driver in making deliveries. The primary objectives of the system are as follows:

a. Ensure that all objects for a stop are delivered at the correct stop;
b. Ensure that no objects are delivered at the wrong stop;
c. Inform the driver where the objects to be delivered are located in the trailer;
d. Display delivery instructions to the driver at each stop;
e. Record objects that are rejected by the customer;
f. Record returns;
g. Record container returns;
h. Record cash and checks received;
i. Produce a delivery receipt;
j. Capture customer's digitized signature for proof of delivery; and
k. Support uploading of returns, pick-ups, rejects and funds received at route completion data at the end of the route.

Understanding how the term object is utilized in this document is crucial to understanding the organization, content and intent of what is written in this document. Everything which is loaded into a trailer for a route is called an object. Every object is an item, a container, or a piece of equipment. An item is something a customer has ordered. Example object is a full case of some product or an individual product. Each container may contain any combination and any number of other containers and items. Example containers are pallets, totes, carts and baskets. Each piece of equipment is something that is utilized in the performance of one or more tasks. An object of equipment may be loaded onto a trailer by a loader for use during the route by a driver or it may be an object which is delivered at a stop along the route. Examples of equipment are empty containers, freezer blankets and load bars.

The delivery server system (19) provides support for each driver as he or she performs a route. The functions provided for each driver are as follows: logon, pre-Route vehicle inspection, stop selection, delivering items, rejecting items, reviewing shorts, loading pick-ups, loading returns, sign-out, printing delivery receipts, stop completion, post-route vehicle inspection, and check-in.

Figure 4:
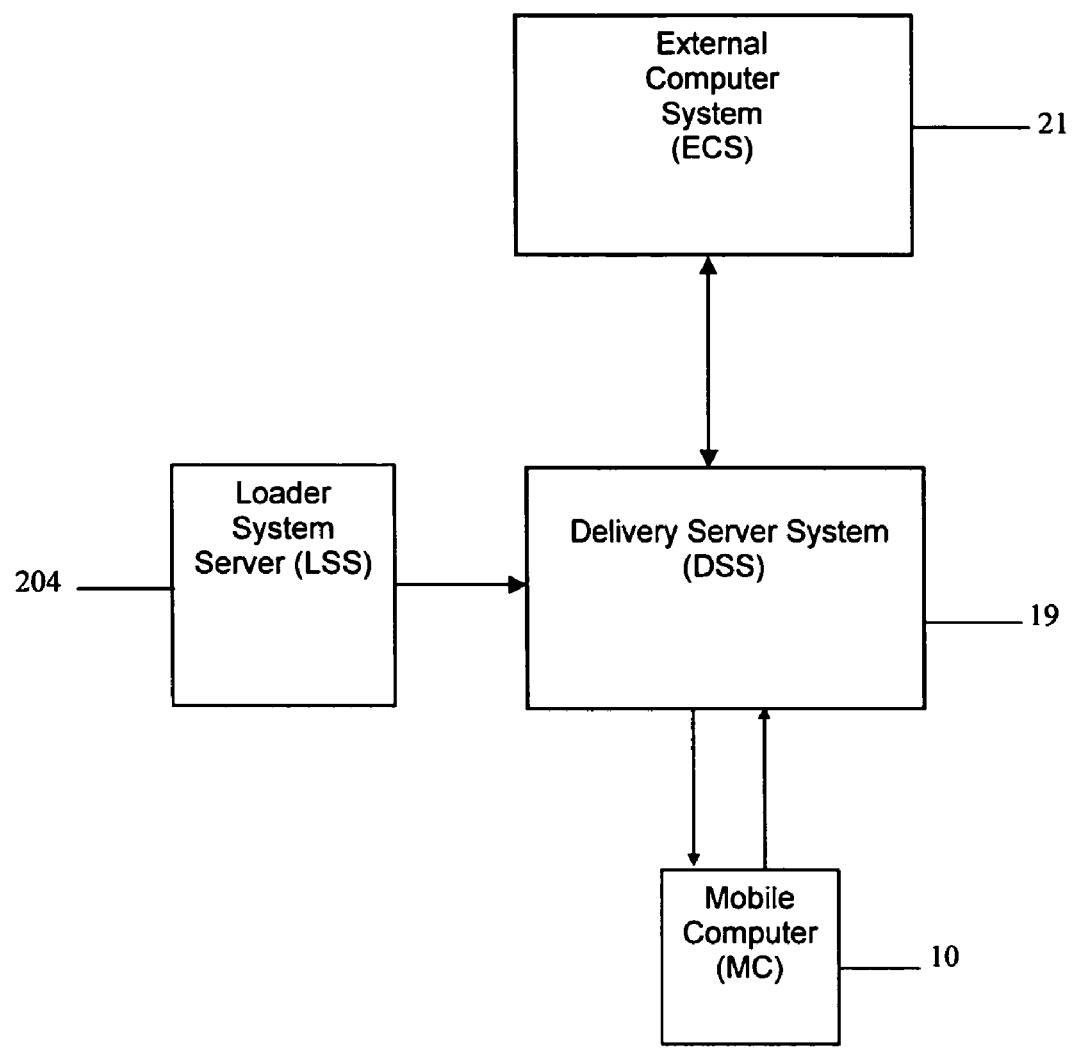
FIG. 4 is an overview of the system of the example.

Several components, both within and external to the delivery server system are involved in the delivery operation. These components are shown in FIG. 4 and detailed below.

The delivery server system (DSS) (19) obtains route information (delivery instructions) from the delivery company's accounting system or routing system or from a selection or loading system. The DSS sends completed delivery information back to the accounting or routing system when routes are completed.

The mobile computer (MC) (10) which tells the driver which objects to deliver at each stop and verifies (by scanning bar codes) that the correct objects and quantities of objects are in fact delivered at each stop. The MC consists of a processor with integrated laser scanner and optional label or receipt printer. The MC obtains route information from the DSS prior to beginning a route and sends completed delivery information back to the DSS at the end of the route.

Two other components provide data for the delivery server system:

a. An external computer (21), also known as the customer's accounting system or routing system, sends the route information to another external (22) or to the DSS. This information identifies the stops and stop details for each route; and
b. The second external computer can be a loader system server (LSS) (204), that provides information about objects that were actually loaded into a transport vehicle or trailer for each route and the zone of the trailer where each object may be found. Details of this example are in FIG. 4.

The initial training contemplated for the system involves the following. When a user logs onto the MC (10), the user ID is validated. Provided the user ID is valid, an additional check is made to determine whether or not the user has voice-trained the system. If so, the MC is ready for use and the MC speaks the next appropriate prompt. However, if the user has not voice trained the system, the MC announces that it is about to train the basic system vocabularies. The MC then prompts the user to speak each of the basic system phrases. This training process requires less than 3 minutes.

The MC then announces that it is beginning training and that the selector should say each word as it is displayed on the screen. The MC displays a group of basic system phrases (or words) one phrase at a time and waits for the selector to say that phrase.

Once the driver has spoken the phrase displayed on the screen, the MC displays the next phrase. This process continues until each of the basic system phrases has been displayed. When the last phrase has been spoken, the MC announces, "the training is done" and the MC proceeds to the next appropriate prompt.

While training the basic system phrases trains many of the words used by the MC, it is not contemplated to train all the phrases. The basic system phrases are those phrases that are common to many of the MC prompts. Other phrases exist that are only used at one or two prompts. For example, the phrase "pick short" may only be spoken at the pick quantity prompt. If the system is having difficulty understanding a certain phrase, the user may say "display menu" and train that particular word that is not being understood.

The system is contemplated to have a configuration menu that will allow the selector to modify certain MC settings that were either automatically defaulted by the system or set up during initial system startup. The MC settings that may be modified include the sound of the MC voice, any previously trained word or phrase, the portable printer ID (if any) and the laser scanner ID (if any). In order to modify one of these MC settings, the selector should say, "display menu" while at most MC prompts. When the MC recognizes the display menu command, the MC displays the System Configuration Menu and prompts the selector to speak the desired menu function.

Figure 5:
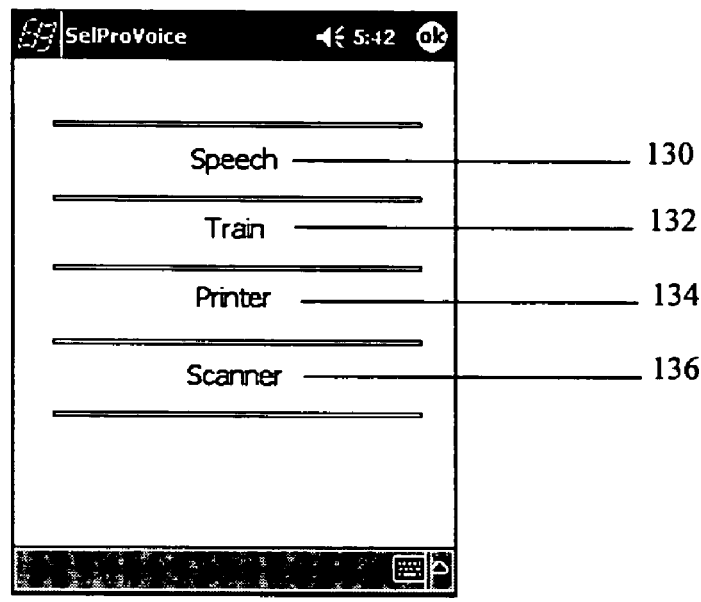
FIG. 5 is the MC configuration menu.

The selector may say one of the following four words to select the corresponding function as shown in FIG. 5.

a. "Speech" (130)—Allows the selector to modify the volume, speed and pitch of the MC voice;
b. "Train" (132)—Allows the selector to retrain a particular word or phrase;
c. "Printer" (134)—Allows the selector to change label printers. If the MC does not support a portable label printer, the MC announces, "There are no printers configured" and exits the system configuration menu;

d. "Scanner" (136)—Allows the selector to change laser scanners. If the MC does not support a laser scanner, the MC announces, "There are no scanners configured" and exits the system configuration menu; and e. If the selector decides he does not want to perform any of the menu functions at this time, he may also say, "cancel" (or press the clear key) to exit the system configuration menu. When this is done, the MC repeats the prompt that was spoken before the selector said, "display menu".

When the MC is first started, the volume, speed and pitch of the MC voice are either set to the default values or to the last values selected by the selector. The system configuration menu shown in FIG. 5 allows the selector to modify these parameters that control the MC voice. While the system configuration menu is displayed, the selector may say "speech" (130) in order to configure the MC voice. When the selector says "speech", FIG. 6 is displayed.

The selector may adjust the volume, speed and pitch by either taping the appropriate control on the screen or by speaking the appropriate control command. After a control is tapped or a control word is spoken, the MC makes the corresponding adjustment and then asks, "How is this?" using the adjusted MC voice. The selector may continue to tap the controls or speak the control words until the MC voice is the way he wants it. The selector should then say, "done" to indicate he has completed the MC voice adjustments. The selector may also say, "cancel" to discard any adjustments made to the MC voice. Once the selector has said "done" or "cancel", the MC returns to the prompt that was spoken before the selector said "display menu".

Figure 6:
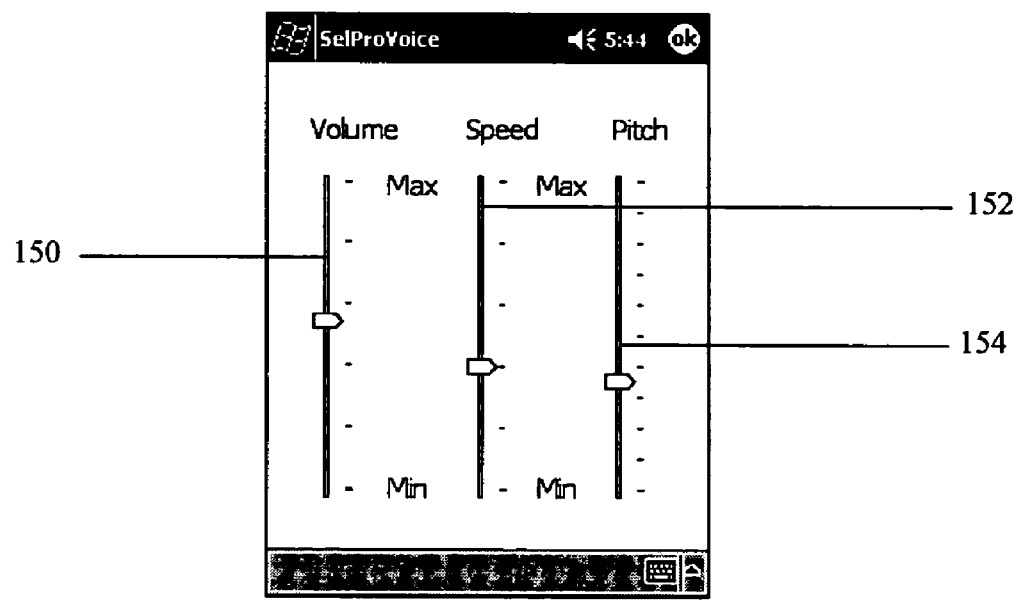
FIG. 6 is the speech configuration display.

The following control words may be spoken in order to adjust the MC voice parameters as shown in FIG. 6.

a. Volume (150)—Use the words "louder" and "softer" in order to increase or decrease the MC voice volume;

b. Speed (152)—Use the words "faster" and "slower" in order to increase or decrease the speed of the MC voice; Pitch (154)—Use the words "increase" and "decrease" in order to increase or decrease the MC voice pitch, see FIG. 6;

c. Each selector can train the MC to understand his voice and speech patterns. These speech patterns represent the various words, phrases, numbers and alphabetic characters that the selector may have to say during the operation of the Selector Pro task. When the selector logs on for the very first time, the selector is prompted to voice-train the system. Once the selector has trained the system, it is not necessary to do so again. These speech patterns are recorded and saved on the host computer. When the MC changes selectors, the speech patterns for the new selector are loaded onto the MC. The MC can then recognize the commands and responses spoken by that new selector.

Figure 7:
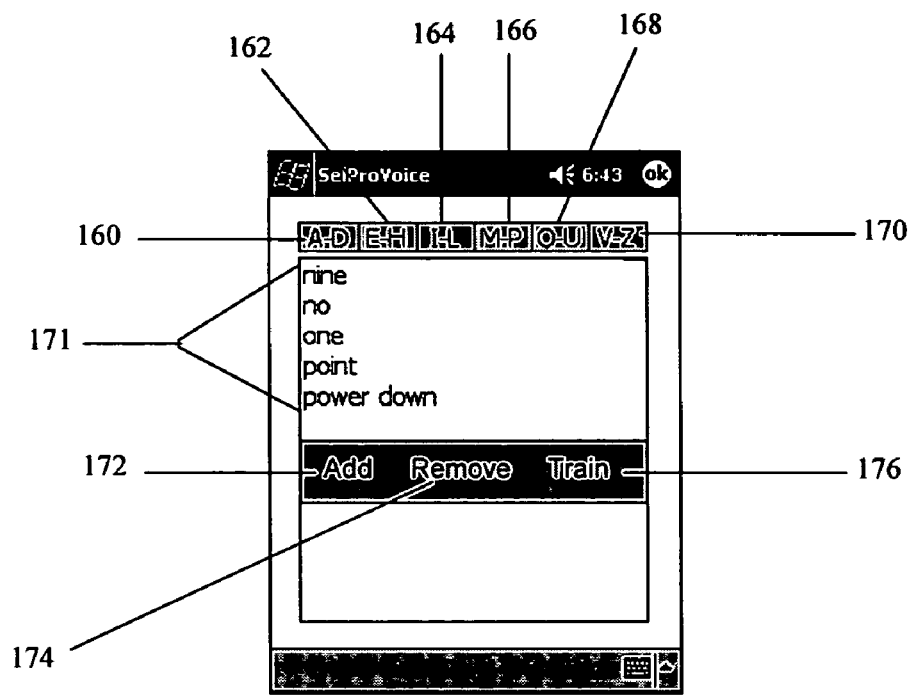
FIG. 7 is the retraining display.

If the MC ever has trouble recognizing any word(s) spoken by the selector, that word or words can be "retrained". When a word is retrained, the selector is prompted to say that word again. Once the MC has obtained a new voice sample, the speech pattern for that word or phrase is saved and reused the next time the speech patterns for that selector must be loaded onto the MC. Hopefully, by retraining the word or phrase, it will improve the ability of the MC to recognize the word the next time it is spoken. While the System Configuration Menu is displayed, the selector may say "train" (132) in order to retrain one or more words then another configuration screen is displayed, see FIG. 7. FIG. 7 has touch points (buttons) (160, 162, 164, 166, 168 and 170) that allow the user to select groups of words based on the groups of alphabet characters shown on the touch points. The user can select from the displayed words (178) and use the operations touch points to add (172), remove (174) or initiate training (176), for the selected word or words.

The retraining screen allows the selector to select the word(s) to be retrained. Since there can be a large number of words from which to choose, the MC divides the words into small groups alphabetically. The headings at the top of the screen (e.g. A-D, E-H, etc.) (160, 162, 164, 166, 168 and 170) indicate the group of words for that heading. The selector should tap the heading in which the word to be trained would be found. When a heading is tapped, the list of words (171) that may be selected for training is displayed. The selector should tap on the word to be trained and then tap the 'Add' (172) button. If there is more than one word the selector would like to train, the selector should tap that word and then tap the add button again. The selector may tap any group heading and add words to be trained in any order. The user may tap the remove button (174) to remove a word from the training list. Once the selector has built the list of words he would like to train, he should tap the train (176) button. When the train button is tapped, the MC announces that it is beginning training and that the selector should say each word as it is displayed on the screen. The MC displays each of the selected words one word at a time and waits for the selector to say that word.

When the last word to be trained has been spoken, the MC announces, "the training is done" and the MC returns to the prompt that was spoken before the selector said, "display menu". When the MC is first started, the selector is prompted to identify the portable label printer. During the course of the shift, the printer might malfunction or otherwise break requiring that the printer be exchanged with another. The system allows the selector to change printers anytime. While a menu is displayed, the selector may say "printer" (134) in order to associate the MC with a new label printer.

The selector is prompted to select a printer from the dropdown list displayed on the screen. An icon, such as an arrow, can be tapped on the dropdown list to reveal a list of supported printers. By tapping the desired printer, the printer is selected. If no printer is going to be used, the selector may select "disable" (which is always one of the choices). If the selector taps disable, the MC announces that "printing is disabled" and the MC returns to the prompt that was spoken before the selector said, "display menu". When printing is disabled, no label printing occurs.

Provided a valid printer was selected from the dropdown list, the MC prompts for the printer ID.

The printer ID is the combination of letters and numbers used to uniquely identify the printer. Usually there is a bar code label on the printer that contains this unique identifier. The identifier may be scanned in, keyed in or spoken. Once the identifier has been entered, the MC announces that it is "attaching to printer" and attempts to communicate with the printer to make certain that the printer ID is valid and the printer is operational. For this reason, the printer must be turned on before the printer ID is entered. If after several attempts the MC is unable to communicate with the printer, the MC announces that it cannot connect to the printer and prompts the selector to enter a new printer ID. The selector may reenter the printer ID and attempt to connect to the printer again. The selector may also say, "cancel" or press the cancel key to return to the prompt that was spoken before the selector said, "display menu". Note, if the selector cancels without connecting to the printer, no labels will be printed.

Provided the selector w as successful connecting to the printer, the MC announces "The current printer is the <printer name>" and then returns to the prompt that was spoken before the selector said, "display menu".

When the MC is first started, the selector is prompted to identify the laser scanner. During the course of the shift, the scanner might malfunction or otherwise break requiring that the scanner be exchanged with another. A menu can be used which allows the selector to change scanners anytime. While the system configuration menu is displayed, the selector may say "scanner" (136) in order to associate the MC with a new laser scanner.

The selector is prompted to select a laser scanner from the dropdown list displayed on the screen. An arrow can be tapped from a dropdown list to reveal the list of supported scanners. By tapping the desired scanner, it is selected. If no scanner is to be used, the selector may select disable (which is always one of the choices). If the selector taps disable, the MC announces that "scanning is disabled" and the MC returns to the prompt that was spoken before the selector said, "display menu". When scanning is disabled, the selector must identify each slot manually.

Provided a valid laser scanner was selected from the dropdown list, the MC prompts for the scanner ID.

The scanner ID is the combination of letters and numbers used to uniquely identify the scanner. Usually there is a bar code label on the scanner that contains this unique identifier. The identifier may be keyed in or spoken. Once the identifier has been entered, the MC announces that it is "attaching to scanner" and attempts to communicate with the scanner to make certain that the scanner ID is valid and the scanner is operational. For this reason, the scanner must be powered up before the scanner ID is entered. If after several attempts the MC is unable to communicate with the scanner, the MC announces that it cannot connect to the scanner and prompts the selector to enter a new scanner ID. The selector may reenter the scanner ID and attempt to connect to the scanner again. The selector may also say, "cancel" or press the cancel key to return to the prompt that was spoken before the selector said, "display menu". Note, if the selector cancels without connecting to the scanner, the selector must identify each slot manually.

Provided the selector was successful connecting to the scanner, the MC announces "The current scanner is the <scanner name>" and then returns to the prompt that was spoken before the selector said, "display menu".

Figure 8:
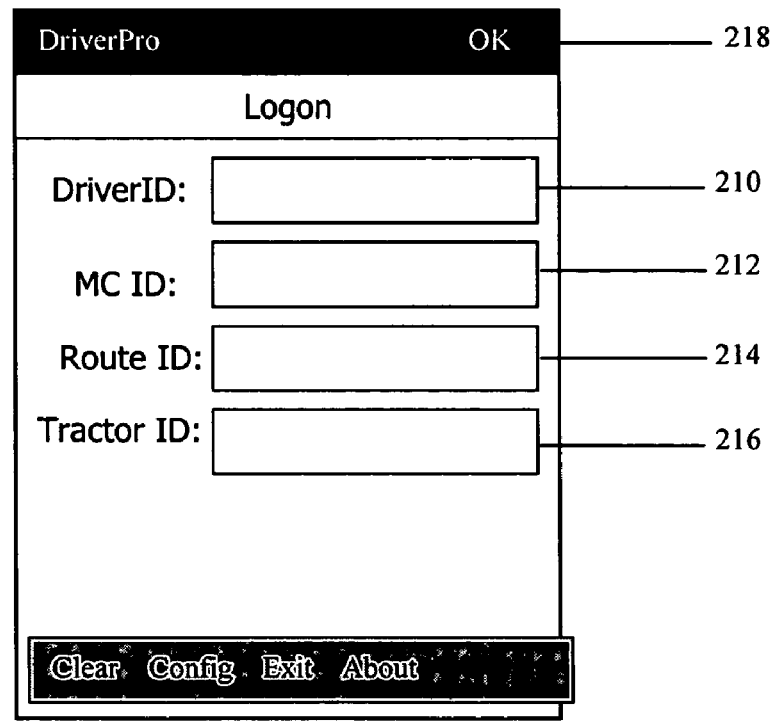
FIG. 8 is a log on screen.

A driver begins the shift by checking out a MC unit and powering the unit on. He or she can then launch the delivery system from the start menu on the MC unit. The log on screen is displayed as shown in FIG. 8.

The entry fields on the log on screen will be defaulted to blank values. The driver must scan or enter his driver ID (210), mobile computer (MC) ID (212) and tractor ID (216). The driver may enter a route ID (214). When the values have been scanned or entered, the driver taps "OK" (218) on the top right-hand corner of the screen. The MC tries to communicate with the DSS in a wireless mode. The driver needs to be within radio frequency coverage to log on to the MC. Once a connection is established with the DSS and the log on information is validated, the corresponding route plan for the route is downloaded to the unit. If the driver did not enter a route, but there is one assigned to him, that route will be downloaded. If the driver does specify a route, but the route is assigned to another driver, the route will not be downloaded and an error message will be displayed.

Figure 9:
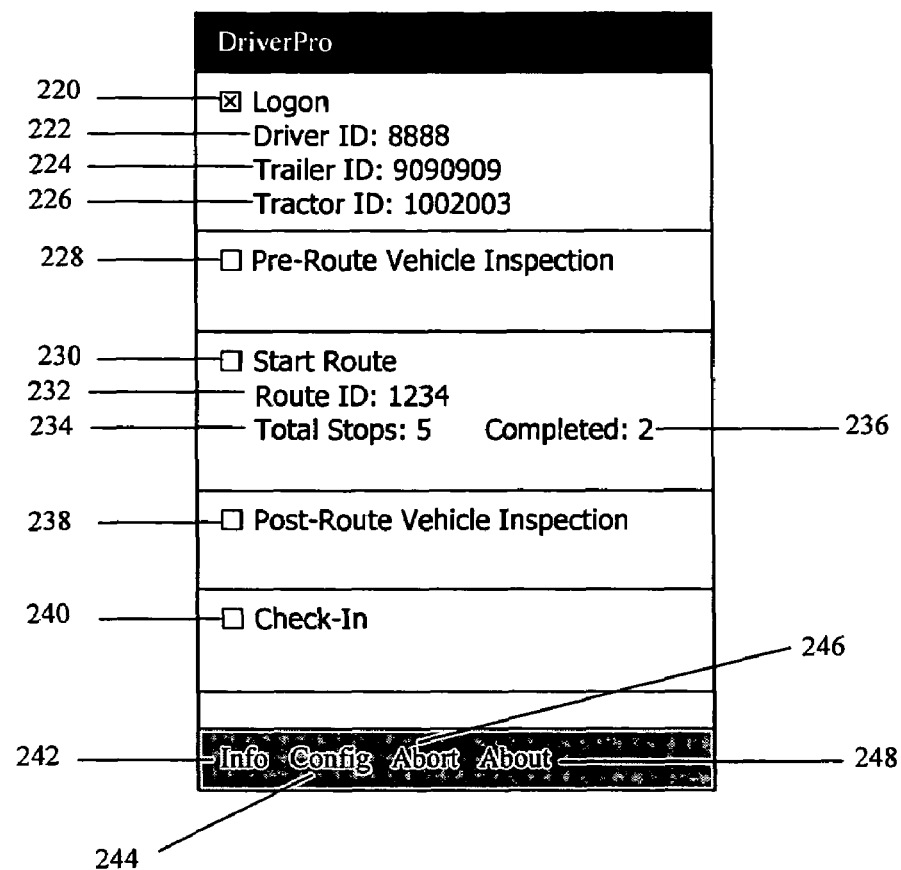
FIG. 9 is a route status screen.

Once a route has been verified and downloaded, the route status screen shown in FIG. 9 is displayed. A verification that the driver is logged on is provided as element (220). The route status screen serves as the main menu of the application. The screen provides details on the driver ID (222), trailer ID (224), tractor ID (226), route ID (232), total stops (234) and completed stops (236). From this screen, the driver can choose to perform a pre-route vehicle inspection (228), start a route (230), perform a post-route vehicle inspection (238), and check in (240) (complete the route). The display also has the following touch buttons:

a. Info (242) that provides a review of any special instructions;
b. Config (244) that displays the system configuration display;
c. Abort (246) which allows the driver to abort the route; and
d. About (248) which displays the system version information.

On the pre-route vehicle inspection screen, the driver is required to indicate whether the tractor passed or failed each of a list of inspection objects. The inspection criteria list is configurable and defined on the DSS. When the tractor fails an inspection criteria, it means that the tractor is considered defective and normally would mean that the tractor should be serviced or repaired before it is used. The specific procedures for handling a failed pre-route inspection will vary but in most cases, such a failure should be brought to the attention of the transportation management. The driver can then choose another tractor by returning to the log on screen and entering a different tractor ID.

Once the pre-route vehicle inspection has been completed without failure, the driver will be prompted to enter the odometer reading and select the fuel level from a dropdown list.

Figure 10:
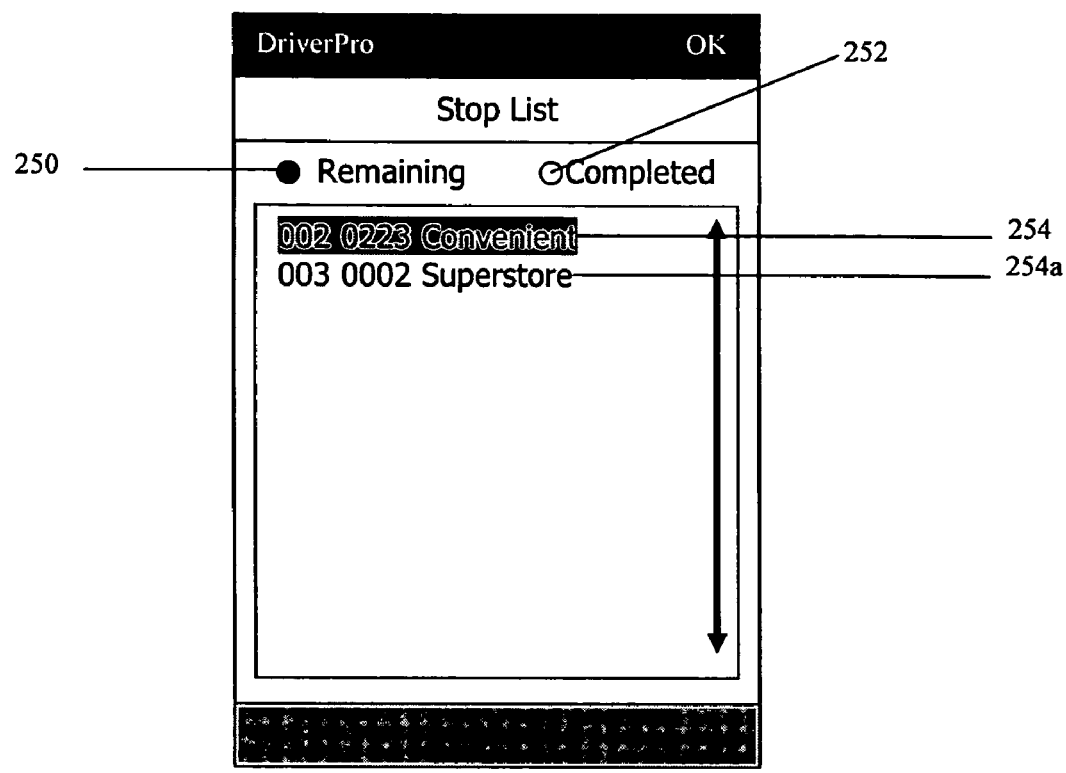
FIG. 10 is a stop list screen.

When the driver is ready to start a route, he selects the "start route" option on the route status screen to display the stop list screen as shown in FIG. 10.

Anytime this screen is requested, the driver will be presented with a list of remaining stops, such as (254) and (254a) on the route. The stops on this display will be shown in the normal stops order with the next stop at the top of the list and the last stop at the bottom. The driver may toggle between the "remaining" button (250) and "completed" button (252) buttons to show either the remaining stops or the completed stops.

While the stops are displayed in the normal stop order, the driver can select any stop by tapping on a specific stop on the list to bring up the stop summary screen as shown in FIG. 10.

Figure 11:
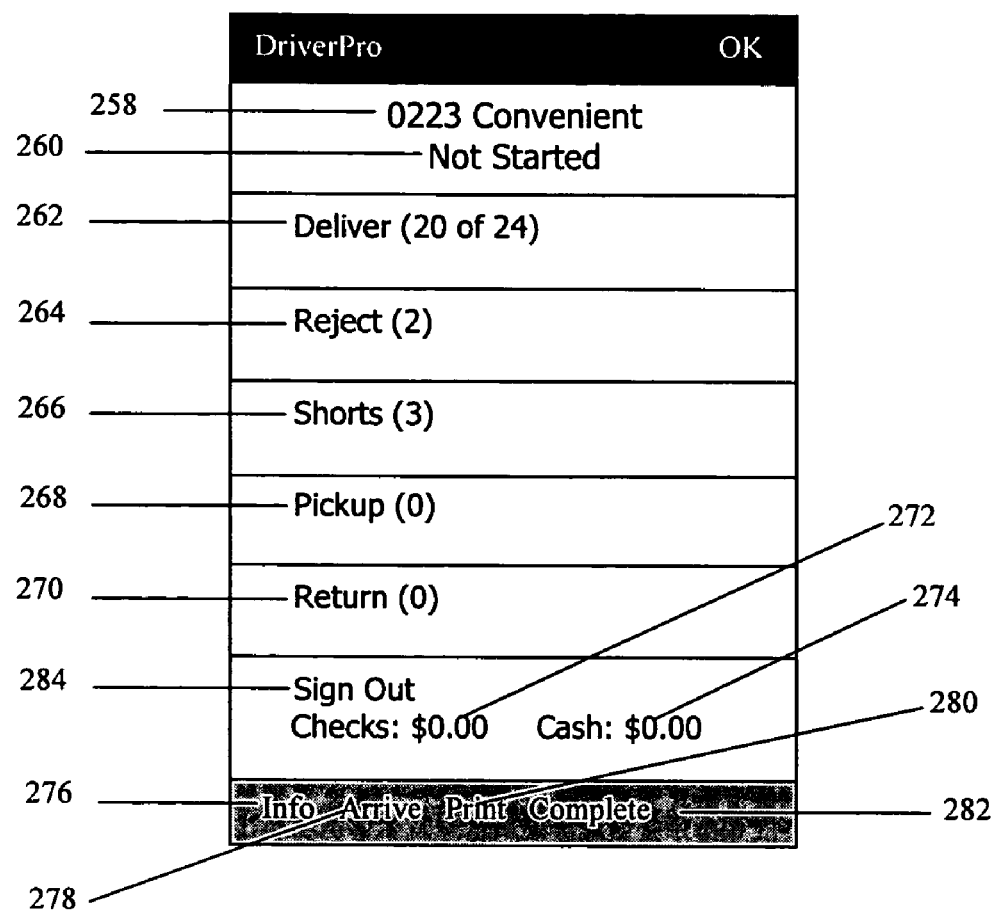
FIG. 11 is a stop summary screen.

The stop summary screen of FIG. 11 provides summary information on a specific stop and allows the driver to initiate the various activities at the stop. The stop name (258) and status (260) are displayed at the top of the screen. The status can be "not started", "in progress" or "completed".

When the driver has not yet indicated arrival at the stop, the status is shown as "not started". Once the driver has indicated arrival, the status becomes "in progress". In this state, all of the activities are valid. The "print" command (280) causes a checklist to be printed up until the signature has been captured on the sign out screen. Once the signature has been captured, the print command causes the delivery receipt to be printed. The "complete" command (282) is not valid until the delivery receipt has been printed.

As shown in FIG. 11, this screen provides for 5 activities: deliver (262), reject (264), shorts (266), pickup (268), return (270), and sign out (284). For each activity, summary data is provided so the driver can view useful summary information at a glance such as objects remaining to be delivered, objects rejected, objects picked up, objects returned, and checks and cash received. The pickups, returns and funds received (cash (272) and check $ (274)) may be disabled for those installations which do not desire these features.

At the bottom of the stop summary screen is a command bar with 4 commands: info, arrive, print and complete. Tapping the "info" command displays the stop info screen as shown in FIG. 12.

Figure 12:
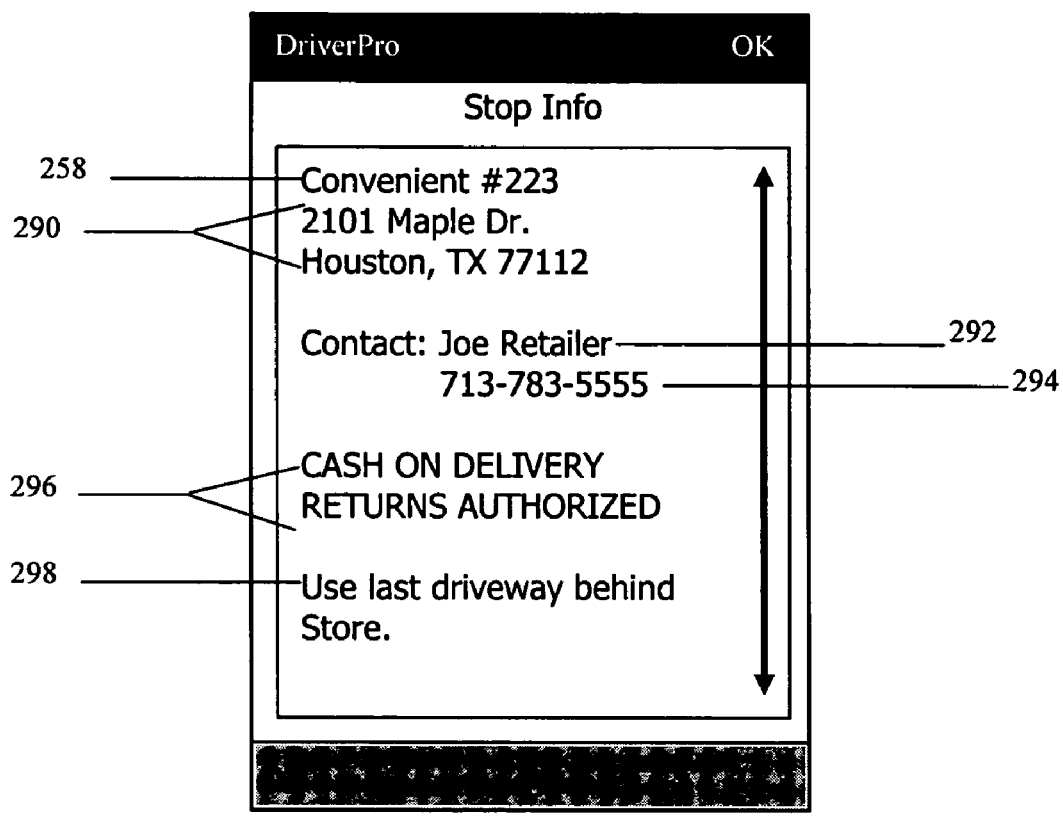
FIG. 12 is a stop information screen.

The stop info screen shown in FIG. 12 presents the driver with relevant information about the stop. This information is installation specific, and can include the stop name (258), address (290), contact name (292), and phone number (294) of the stop. Notifications like "cash on delivery" and "returns authorized" (296) can be presented on this display. Delivery instructions and other customer specific information (298) can be presented as well. The scrollbar enables the driver to scroll through the information when it cannot all fit on the screen at the same time. Selecting the "OK" at the top right-hand corner of this screen returns to the stop summary screen.

Figure 13:
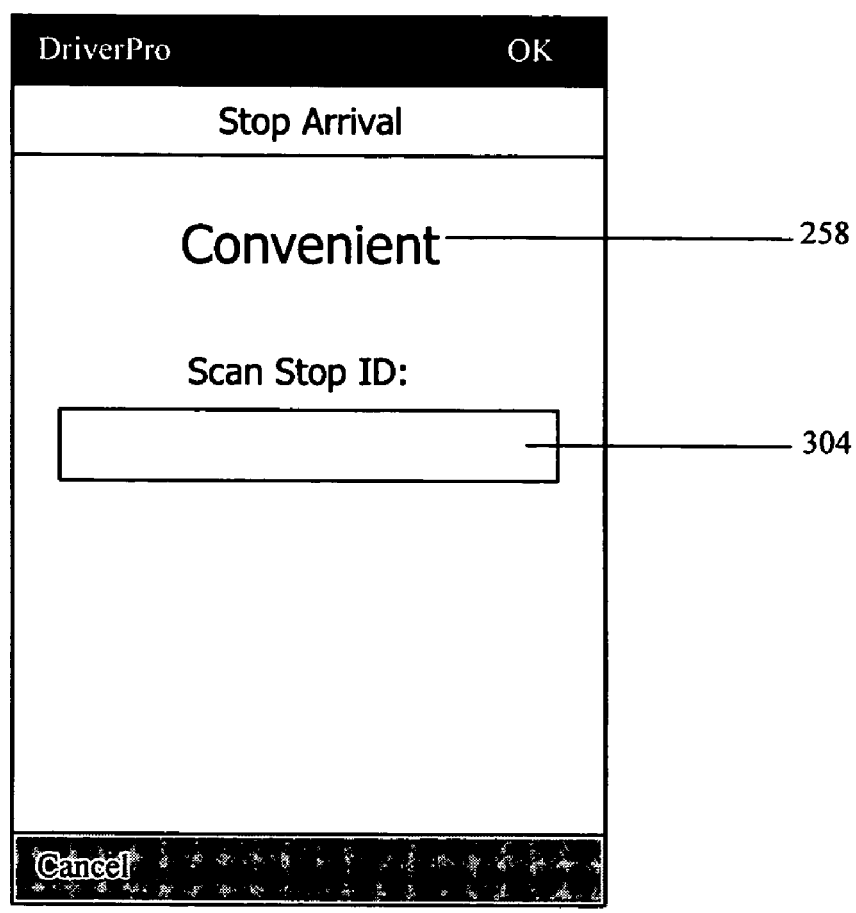
FIG. 13 is a stop arrival screen.

When the "arrive" command on the stop summary screen is tapped, the stop arrival screen shown in FIG. 13 is displayed. The screen displays the stop name (258) and requests entry of the stop ID by providing the instruction (304) "scan the stop ID" such as a stop barcode to confirm that the driver is actually at the selected stop. The arrival time for the stop is the time when the barcode is scanned.

Figure 14:
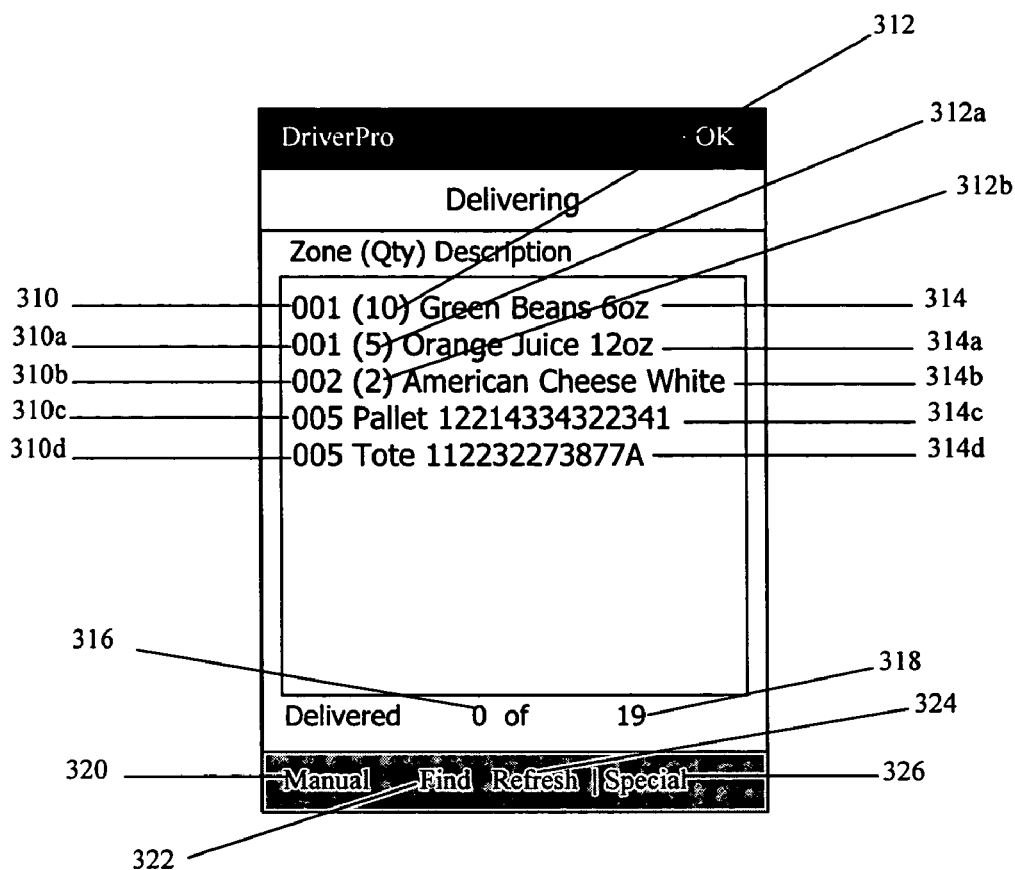
FIG. 14 is a delivering screen.

When the driver is ready to start delivering objects at a stop, he selects "deliver" on the stop summary screen to bring up the "delivering" screen as shown in FIG. 14.

The delivering screen presents the driver with a list of objects remaining to be delivered for the stop. Each object contains a leading number indicating the zone in which the object is located (310a, 310b, 310c and 310d). If multiple objects of the same product exist in the same zone, then only a single line is presented for this product on the screen. The actual object quantity (312, 312a and 312b) is shown in parenthesis before the product description (314a, 314b, 314c and 314d).

a. Example: "001 (10) green beans 6 oz" means there are ten cases of the product "green beans 6 oz" to be delivered from zone 001. Also, this screen can show how many objects were delivered (316) out of the total of objects to be delivered (318).

When this screen is displayed the driver may perform any of the following:

a. Scan a barcode. Normally when this screen is visible, the driver should scan the barcode on the label printed and affixed by a selector to an object which is to be delivered at the current stop. As each object is scanned, one of the following occurs:

i. If there is a barcode which specifically identifies a single deliverable object the quantity of that product to be delivered at the stop and shown on this screen is reduced by one. When all of the specified product has been delivered, the product is removed from the list of objects to be delivered. If a specific object is scanned more than once, an error message is displayed indicating that the object has already been delivered. If any barcode other than the one prepared by the Selector Pro system and affixed by the selector is scanned, a message is displayed telling the driver that an incorrect label has been scanned; or ii. If the object scanned represents a "high quantity" object (i.e., one for which there are multiple objects to be delivered but only one barcode for the entire quantity), the screen is activated. When that screen is terminated, the "delivering" screen is reactivated and the remaining quantity to be delivered for the selected product will have been reduced by the quantity which the driver indicated was delivered.

b. Select the "manual" command at the bottom of the screen (320). This command should be selected only when the appropriate barcode of an object to be delivered at the stop cannot be scanned.

c. Select the "find" command at the bottom of the screen (322). This command allows the driver to ask the MC where a specific object is located in the trailer.

d. Select the "refresh" command to update the display (324). The display will automatically be update when 10 objects or less are left. This option allows for maximum scanning speed when many objects exist. The delivered count at the bottom of the screen is always updated.

e. Select the "special" command to popup a menu of special operations (326).

When all objects for the stop have been delivered, the MC will automatically return to the stop summary screen.

Figure 15:
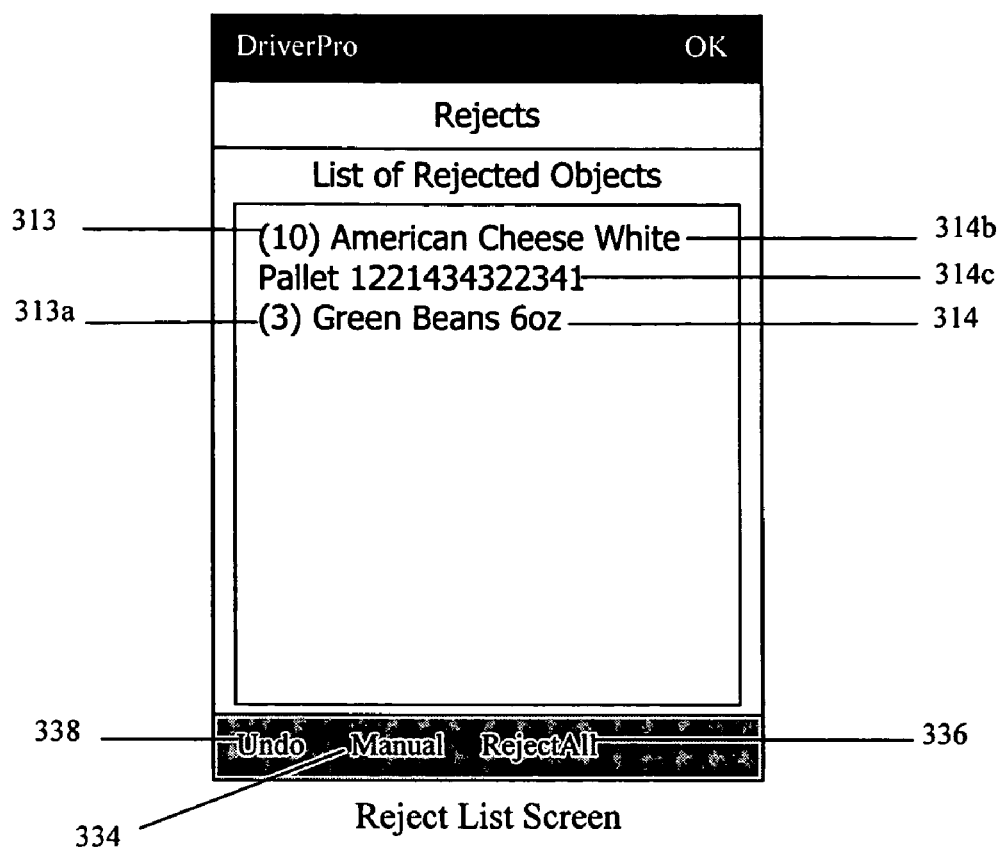
FIG. 15 is a rejects screen.

The delivery system provides the functionality to record objects rejected by the customer. The MC can handle the rejection of both delivered object(s) and object(s) not delivered. The driver selects "reject" from the stop summary screen to bring up the "reject" screen shown in FIG. 15.

The reject list screen shows the driver a list of the objects (314, 314b and 314c) and quantity of those objects (313 and 313a) for the selected stop that have been rejected by the customer. The reject list screen also allows the driver to perform the following functions:

a. Reject an object by scanning its barcode label;

b. Specify an object to be rejected manually by selecting the "manual" (334) command at the bottom of the screen;

c. Reject all objects for the stop by selecting the "reject all" (336) command at the bottom of the screen; and d. Select "undo" (338) while an object or group of objects from the rejected list is selected to cause that object or group to be removed from the rejected object list and marked as objects not yet delivered in the system.

Figure 16:
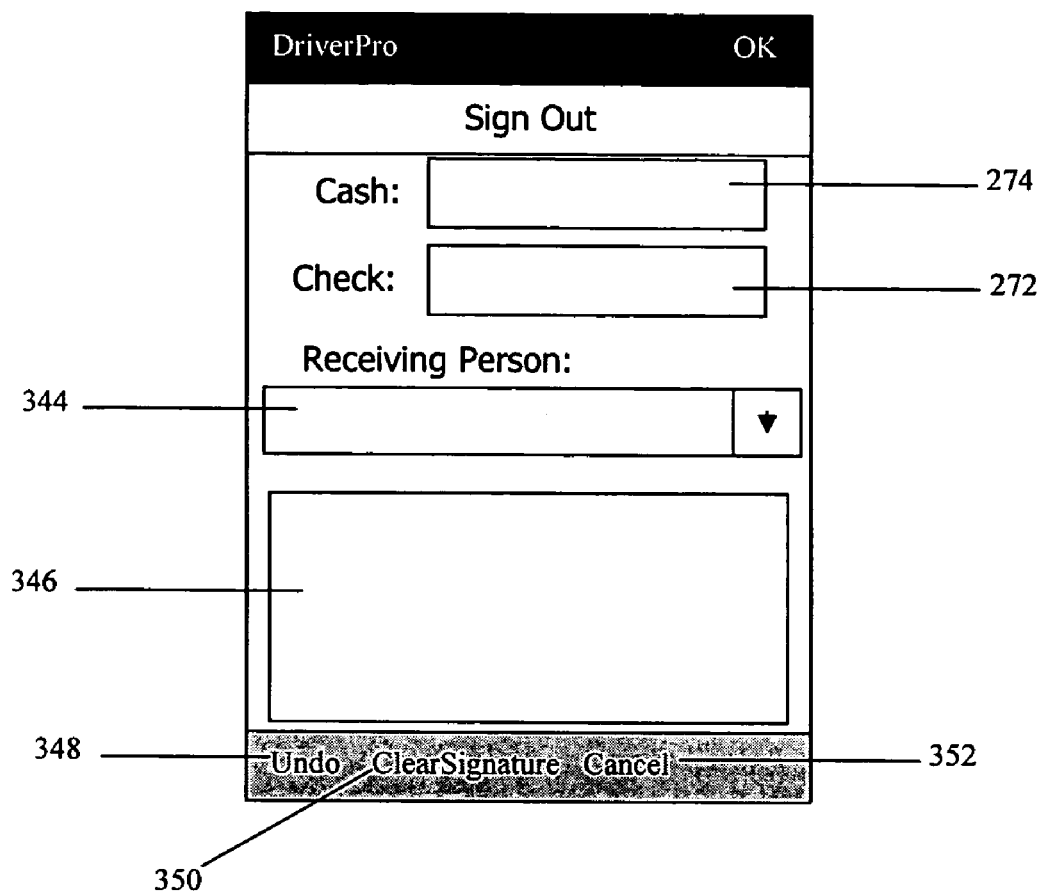
FIG. 16 is a sign out screen.

Once all deliveries, pickups and returns have been recorded, the driver is ready to check with the customer. To do so, the driver selects "sign out" from the stop summary screen to bring up the sign out screen as shown in FIG. 16. MC provides the capability for the driver to record the amount paid by the customer in cash (274) and/or by checks (272) at a stop and a space to capture the signature of the customer (346) electronically. However, the customer signature is only usable with a customer name (344), which is selected from a drop down list.

Above the customer signature box, there is a field used to enter the customer's name (the name of the person signing) (344). The drop down list allows selection of one of the last four people who have signed at this location. If the correct person is not in the list, then name may be directly keyed into the drop down box.

The command bar at the bottom of the sign out screen contains two options: Undo (348) and Clear Signature (350). Selecting undo restores the cash and check amounts to the original values before any changes were made. Selecting clear signature (350) clears the customer signature box.

FIG. 17 shows a typical printed delivery receipt. The top of the receipt shows the date (396) and time (394), the customer name (258) and address (290), and the driver's ID (210). A list of every object (314) and quantity (310) delivered and the total quantity delivered (370). Following the delivered objects is a list of shorted objects (372) and shorted quantities (374) and the total shorted quantity (376) from the warehouse. These items are listed under the heading of "out of stock".

Other objects (380) are categorized under "rejected" along with the individual object quantities rejected (382) and total quantity of objects rejected (384) and are shown. They can be shown as credits. If a credit is to be issued, a credit reference number (378) is printed followed by the details of the credit objects.

The delivery receipt also shows the particular store (386) for customer and an order number (388). The printed name of the person receiving the delivery (344) and the signature of the customer (346) is printed at the bottom.

While this invention has been described with emphasis on the preferred embodiments, it should be understood that within the scope of the appended claims the invention might be practiced other than as specifically described herein.

What is claimed is:

1. A method for delivery of at least one object on a load wherein each of the at least one objects has a destination location comprising:
   a. using a mobile computer having a bar code reader, a display, an audio output device, a tactile input device, non-lexicon text-to-speech software, a voice recognition software, delivery system software, and radio frequency identification (RFID) reader with a user, wherein said mobile computer is adapted for communication between a delivery server and the user, and the delivery server is adapted for communication between the mobile computer and at least one external computer system;
   b. entering a user code of the user to log the user onto the mobile computer;
   c. training the voice recognition software by the user;
   d. providing a list of objects on the load with each respective destination location to the user from the delivery system software;
   e. transmitting a request from the mobile computer to the delivery server to identify all of the least one objects on the load and each destination location per object on the load;
   f. providing a summary list of objects on the load with each corresponding destination location to the user from the delivery system software using the text-to-speech software to the audio output device of the user from the delivery system software;
   g. providing a destination locations list for all of the at least one objects on the load from the delivery system software to the display;
   h. transporting the load with at least one object to a first destination location on the destination locations list;
   i. advising the delivery system software by the user at the first destination location as to the first destination location as to the first destination location using an audio input to speak characters that identify the first destination location and either:
      i. scanning a barcode identifying the first destination location; or
      ii. reading an RFID data to identify the first destination location;
   j. advising the user using the text-to-speech software by the delivery system to indicate that the first destination location is correct and that at least one object is to be delivered to the first destination location;
   k. advising the user using the text-to-speech software which of the at least one objects is to be delivered and the quantity of the at least one object to be delivered at the first destination location;
   l. verifying delivery of the at least one object to the delivery system software by providing information to the delivery system software by identifying the at least one object indicated for delivery at the first destination location to the delivery system software by the user using the audio input to speak characters that identify the at least one object; and either:
      i. scanning the barcode of the at least one object; or
      ii. reading the RFID data of the at least one object;
   m. transporting the load to additional destination locations on the destination location list and repeating steps (k) through (l) until all of the objects have been transported, off loaded, and delivery verified for each of the destination locations; and
   n. transferring the information from the step for verifying delivery to the external computer system upon completion of offloading and verifying of at least one object.

2. The method of claim 1, wherein the transferring of the information from the step for verifying delivery from the delivery system software to the at least one external computer system is at the termination and verification of all deliveries.

3. The method of claim 1, wherein the transferring of the information from the step for verifying delivery system software is at the end of each delivery.

4. The method of claim 1, further comprising the step of generating a receipt of all delivered objects which have been verified.

5. The method of claim 1, wherein at least one object being delivered is refused and the user identifies the object to the delivery system software being refused by:
   a. speaking the characters on the object being refused into the audio input device;
   b. scanning a barcode disposed on the object being refused;
   c. reading an RFID data disposed on the object being refused; and
   d. maintaining the object on the load for return to a sender.

6. The method of claim 1, further comprising the step of using the mobile computer to obtain status information for the user for comparing delivery time needed to deliver the at least one object on the load to an expected completion time for delivery and verifying delivery of at least one object on the load.

7. The method of claim 1, further comprising a step of the user indicating a need to "deliver short" to the delivery system software using the voice recognition software.

8. The method of claim 1, further comprising the step of providing answers to a series of safety questions by the user to the delivery system software regarding a transport vehicle to move the load of the at least one object wherein the answers are from at least one member of the group of questions consisting of:
   a. are the brakes working?;
   b. is the horn working?;
   c. is the steering working?;
   d. is there any damage to the transport vehicle?
   e. is there any leak in the transport vehicle?;
   f. are the tires inflated and undamaged?; and
   g. combinations thereof.

9. The method of claim 1, wherein the destination location can be a member of the group consisting of: a warehouse, a terminal, a dock, a manufacturing site, a customer site or combinations thereof.

10. The method of claim 9, wherein the customer site is a member of the group: a customer store, a residence, and combinations thereof.

11. The method of claim 1, wherein the mobile computer is a handheld computer that indicates a specific zone where the object is located in the load.

* * * * *